United States Patent
Cao et al.

(10) Patent No.: US 7,444,161 B2
(45) Date of Patent: Oct. 28, 2008

(54) SELF & MINUS; ADAPTIVE WEIGHTED SPACE TIME TRANSMITTING DIVERSITY METHOD AND SYSTEM THEREOF

(75) Inventors: Aijun Cao, Shenzhen (CN); Branislav M Popovic, Stockholm (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 79 days.

(21) Appl. No.: 10/508,131
(22) PCT Filed: Mar. 22, 2002
(86) PCT No.: PCT/CN02/00192

§ 371 (c)(1),
(2), (4) Date: Sep. 16, 2004

(87) PCT Pub. No.: WO03/081836

PCT Pub. Date: Feb. 10, 2003

(65) Prior Publication Data

US 2005/0181736 A1   Aug. 18, 2005

(51) Int. Cl.
*H04B 7/00* (2006.01)
*H04B 1/04* (2006.01)
*H04B 1/00* (2006.01)
*H04B 7/02* (2006.01)
*H04Q 7/20* (2006.01)
*H01Q 11/12* (2006.01)
*H04L 1/02* (2006.01)

(52) U.S. Cl. .................. 455/522; 455/69; 455/126; 375/267

(58) Field of Classification Search ............. 455/504, 455/522, 67.11, 69, 126; 375/267
See application file for complete search history.

(56) References Cited

U.S. PATENT DOCUMENTS 5,297,161 A * 3/1994 Ling ........................ 375/130
5,499,395 A * 3/1996 Doi et al. ................. 455/422.1
6,185,258 B1   2/2001 Alamouti et al.

(Continued)

FOREIGN PATENT DOCUMENTS

CA   2317621 A1   3/2001

(Continued)

*Primary Examiner*—Quochien B. Vuong
*Assistant Examiner*—Andrew Wendell

(57) ABSTRACT

The present invention discloses a method of adaptive weighting space-time transmit diversity, comprising: symbols to be transmitted at a transmitting end being output after being space-time encoded according to certain regulation, and the current transmission powers of the two antennae being real-timely adjusted according to the given transmission power weight values; after the transmission powers are determined, the space-time encoded output signals being sent out at two independent antennas by transmitting antenna array in terms of the current transmission power; the fading characters of two wireless channels being estimated by the receiver at a receiving end according to the present received signals and then fed back to the transmitting end; the transmitting end receiving and obtaining the fading amplitude characters of two wireless channels through feedback channel, calculating new adaptive weight values of transmission powers, and adjusting transmission powers according to these weight values. The present invention also discloses a system for implementing the above method of adaptive weighting Space-time Transmit Diversity. In term of the method and structure, the transmission powers can be dynamically adjusted in adaptive weighting manner, in order to boost system performance gain.

12 Claims, 3 Drawing Sheets

U.S. PATENT DOCUMENTS

| | | | |
|---|---|---|---|
| 6,343,218 B1 * | 1/2002 | Kaneda et al. | 455/522 |
| 6,434,366 B1 * | 8/2002 | Harrison et al. | 455/69 |
| 6,636,493 B1 * | 10/2003 | Doi et al. | 370/332 |
| 6,643,338 B1 | 11/2003 | Dabak et al. | |
| 6,766,144 B2 * | 7/2004 | Kim et al. | 455/67.11 |
| 6,771,988 B2 * | 8/2004 | Matsuoka et al. | 455/562.1 |
| 6,850,499 B2 * | 2/2005 | Wheatley, III et al. | 370/328 |
| 6,853,839 B2 * | 2/2005 | Usuda et al. | 455/276.1 |
| 2002/0000948 A1 | 1/2002 | Chun et al. | |
| 2002/0013130 A1 * | 1/2002 | Kim et al. | 455/70 |
| 2002/0080735 A1 * | 6/2002 | Heath et al. | 370/328 |
| 2002/0080894 A1 | 6/2002 | Dabak et al. | |
| 2002/0090038 A1 | 7/2002 | Dabak et al. | |
| 2002/0128026 A1 * | 9/2002 | Derryberry et al. | 455/504 |
| 2003/0017835 A1 * | 1/2003 | Bergel | 455/502 |
| 2003/0148738 A1 * | 8/2003 | Das et al. | 455/67.5 |
| 2006/0115031 A1 * | 6/2006 | Lindskog et al. | 375/348 |

FOREIGN PATENT DOCUMENTS

| | | |
|---|---|---|
| EP | A2 1028556 | 8/2000 |
| EP | A2 0999658 | 10/2000 |
| EP | 1 073 212 A2 | 1/2001 |
| WO | WO A1 0079701 | 12/2000 |

* cited by examiner

SELF & MINUS; ADAPTIVE WEIGHTED SPACE TIME TRANSMITTING DIVERSITY METHOD AND SYSTEM THEREOF

CROSS-REFERENCE TO RELATED APPLICATIONS

This application claims priority of International Application No. PCT/CN02/00192 filed on Mar. 22, 2002.

FIELD OF THE TECHNOLOGY

The present invention relates generally to space-time transmit diversity technology, especially to a method of space-time transmit diversity for real-timely adjusting signal transmission power in an adaptive manner and a system therefore.

BACKGROUND OF THE INVENTION

In the standard of Third Generation (3G) Wideband CDMA (WCDMA) based on Code Division Multiple Access (CDMA), as all subscribers in the same cell and all subscribers in the adjacent cells share the identical frequency band at the same time, there is interference among the subscribers, which restricts system capacity and data transmission rate. To increase the system capacity, manifold diversity methods can be adopted, such as the technology of multi-path diversity, space diversity and antenna diversity, etc. In the diversity-applied system technology, for one piece of information there are more than one independent copies of different formats. After being received by a receiver, these independent copies are specially processed according to Maximum Likelihood (ML) Principle and by taking good use of information redundancy. By doing this, the bit rate error of information transmission is greatly reduced and transmission power of wireless data is decreased, consequently the interference among subscribers being reduced. It shows that system capacity can be effectively improved by using diversity technology.

In the downlink channel of WCDMA system, to implement high-capacity of subscriber number and data transmission with high speed, manifold transmit diversity technologies are also to be applied, and space-time transmit diversity (STTD) is one of those technologies, the content of which being: the information to be transmitted being simply space-time encoded, the space-time encoded signal being divided into two routes which are respectively sent to two independent transmitting channels for transmission according to equal power principle; accordingly, the receiving end respectively receiving the signals from two independent transmitting channels and processing the received signals according to Maximum Likelihood (ML) Principle, as is shown in FIG. 1. In FIG. 1, sign 100 denotes the information to be transmitted, in which $S_1$ and $S_2$ are two transmitting symbols in the same space-time encoding block; sign 101 is the space-time encoding module; sign 106 is the transmitting antenna array, indicating that two dependent transmitting channels perform transmission through antenna Ant1 and Ant2 respectively; Rec is the receiver at the receiving end based on Maximum Likelihood (ML) Principle.

At the receiving end, the received signals of the same space-time encoding module is expressed as follows:

$$\begin{cases} r_1 = h_1 S_1 - h_2 S_2^* + n_1 \\ r_2 = h_1 S_2 + h_2 S_1^* + n_2 \end{cases} \quad (1)$$

In the equation, $r_1$, $r_2$ respectively being the received signals of the same space-time encoding module, $h_1$ and $h_2$ respectively being the fading factors of wireless channel between sending antenna and receiving antenna; $n_1$ and $n_2$ being the receiving noises. According to Maximum Likelihood (ML) receiving principle, Signal Noise Ratio (SNR) of judging variable can be computed as:

$$SNR_{STTD} = \frac{2\sigma_0^2}{\sigma^2} E_s \quad (2)$$

In the equation, $E_s$ being signal transmission power, $\sigma^2$ being system noise power, $\sigma_0^2$ being wireless channel fading character.

In the above method, transmission power is equally divided into two antennas all and singular and the transmission power is not properly distributed between different antennas in terms of certain principle, as a result the best performance is not reached and optimal transmission effect is unattainable.

SUMMARY OF THE INVENTION

Since the fading of two transmitting channels are independent of each other, if there is feedback channel, system performance can be further improved by feeding back the present wireless channel information received at the receiving end to the transmitting end so that the transmitting end can properly distribute transmission power according to the feedback information.

Based on the above ideas, a main object of the present invention is to provide a method of adaptive weighting Space-time transmit diversity for dynamically adjusting transmission power in adaptive weighting manner, in order to improve system performance gain. This method is also easily handled and flexible.

Another object of the present invention is to provide a system for implementing the method of adaptive weighting space-time transmit diversity, which can accomplish real-timely and dynamically adjusting transmission power. The design of this system is simple and the implementation is easy, consequently the system performance of space-time transmit diversity is further improved.

To achieve the above-mentioned object, the specific technical scheme of this invention is as follows.

A method for adaptive weight space-time transmit diversity, comprises:

a. for the symbols to be transmitted at a transmitting end, every two input symbols being made a block and two routes of signals being output after being space-time encoded according to certain regulation;

b. at the transmitting end, the current transmission powers of two transmitting antenna channels being real-timely adjusted respectively according to the currently prescribed power weight values, under the precondition of holding the gross transmission power invariable;

c. after the transmission powers are determined, the space-time encoded output signals being sent out at two independent antennas by the transmitting antenna array in terms of the current transmission powers;

d. the fading characters of two wireless channels being estimated by the receiver at a receiving end according to the present received signals, the fading amplitude characters of the two wireless channels being encoded and then being fed back to the transmitting end;

e. the transmitting end receiving and obtaining the fading amplitude character information of two wireless channels through a feedback channel, calculating the new adaptive transmission power weight value of the two transmitting channels, and adjusting transmission powers according to these weight values;

The above method may further comprise: for the initial transmission, the transmitting end setting the transmission power weight values of the two antennas as 1/sqrt (2.0) in terms of equal transmission power principle.

In the above scheme, step a further comprises: setting one of the two signals to be the same as the input block signal, and another signal to be the conjugate inverted sequence of input block signal and the first output symbol being inversed.

Step b further comprises: the adjustments of the transmitting end power being in the coherent time of wireless channel and performed real-timely, with a time slot as a unit.

In step e, the step of the transmitting end receiving the fading amplitude character information of wireless channels, further comprises:

e1. a feedback signal processing module collecting the separately distributed Feedback Information (FBI) bits;

e2. the feedback signal processing module incorporating the collected FBI bits;

e3. the feedback signal processing module decoding the incorporated FBI, obtaining the values representing the fading amplitude character of wireless channels, which are imported to an optical weight calculating module.

In step e, setting Feedback Information (FBI) field of uplink transmission as the feedback channel, and the estimated fading amplitude character information of the two wireless channels being sent to the transmitting end through the feedback channel.

In step e, the adaptive weight values can be calculated according to the fading amplitude characters of the two wireless channels, or according to the ratio of the two wireless-channel fading amplitudes.

In the present invention, a system for implementing the said method of adaptive weighting space-time transmit diversity is also provided, at least comprising a space-time encoding module at the transmitting end, a transmitting antenna array with two antennae and a receiver with maximum likelihood receiving module at the receiving end. The key is that the transmitting end further comprising a transmission power distributing module, a feedback channel, a feedback signal processing module and an optical weight calculating module.

After being encoded by the space-time encoding module, the symbols to be transmitted are sent out as two routes of signals; the transmission power distributing module adjusts the transmission powers of the two transmitting antenna and then sends out the two routes of signals from the two antennas in the transmitting antenna array; the receiver at the receiving end receives and processes the transmitted signals and then feeds back the fading amplitude character information of the current wireless channels to the feedback signal processing module at the transmitting end through feedback channel, the values gained after the process are sent to the optical weight calculating module for calculating new transmission power weight values, and the new weight values are sent to the transmission power distributing module for adjusting transmission powers.

In the above system, the said feedback channel is carried by the separately distributed FBI bits in a physical channel.

From the above scheme, the key of the present invention lies in that the transmitting end recalculating proper transmission power weight values according to the received fading amplitude character information of the current two wireless channels, redistributing transmission power in order to improve system performance.

The method of adaptive weighting space-time transmit diversity and the corresponding system provided in the present invention take on the flowing advantages and characteristics:

1) In the present invention, the optical transmission power weight values of different antenna can be calculated according to the feedback the fading amplitude information concerning the wireless channels, in order to properly distribute transmission power and greatly improve system performance without adding antenna and other devices. Comparing with the prior STTD, the performance can be improved to 1.55 db.

2) In the present invention, the optical weight values can be calculated only according to the ratio of amplitude characters of the two wireless channels by feeding back to the transmitting end, in which requirement for feedback channel capacity is greatly decreased.

3) In the present invention, transmission power values are adjusted real-timely according to the currently received wireless channel character information to form adaptive adjusting mechanism with simple and flexible operation.

4) In the present invention, only the transmission power distribution, the feedback signal processing and the optical weight calculating modules are added, making little change to the existing system, with simple design and easy implementation.

5) It's testified through simulation tests and theoretical analysis, in terms of the method and system of the present invention, the error rate is much lower than that of the prior STTD in condition of equal signal noise ratio (SNR); what's more, in condition of equal error rate, the transmission power required by the present invention is much lower. Therefore, the more signal noise ratio (SNR) increases, the more performance gain of the system increases.

EMBODIMENTS OF THE INVENTION

Now, the present invention will be described in detail with reference to the accompanying drawings and specific embodiments.

Figure 1:
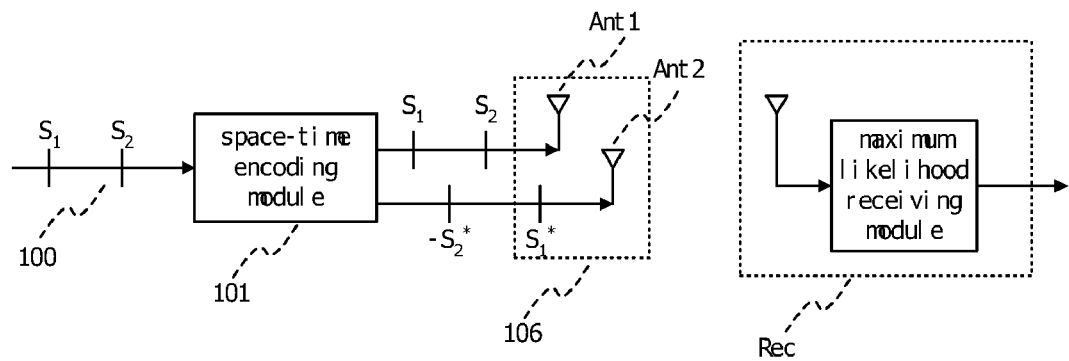
FIG. 1 is the sketch demonstrating the system composition structure of STTD in the prior art.
Figure 2:
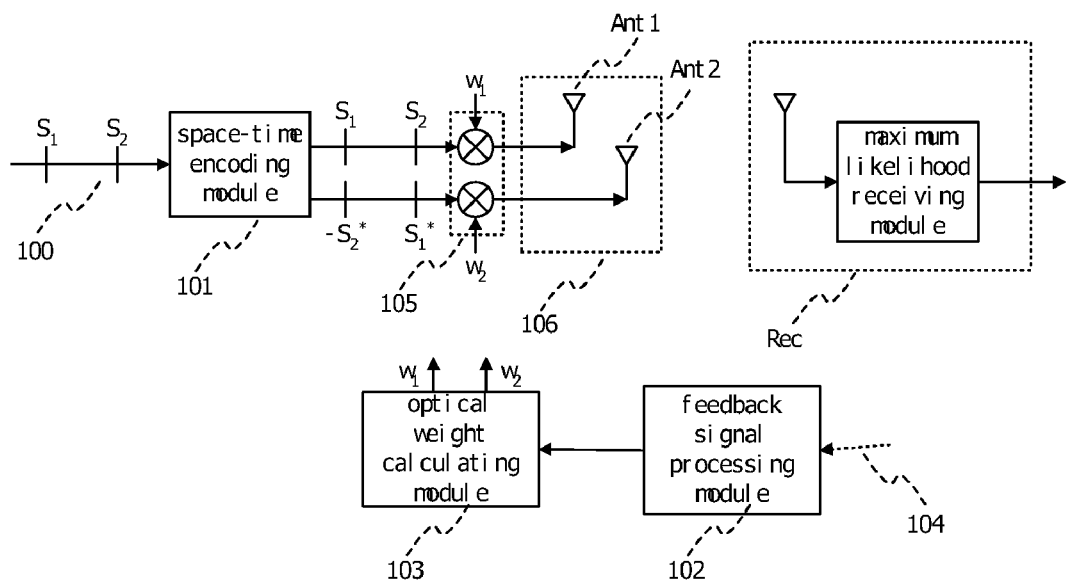
FIG. 2 is the sketch demonstrating the system composition structure of space-time transmit diversity in terms of the present invention.

FIG. 2 is the sketch demonstrating the system composition structure of space-time transmit diversity in terms of the present invention. As is illustrated in FIG. 2, this system comprises space-time encoding module 101, transmitting antenna array with two antennae 106 and a receiver consisting of maximum likelihood receiving module; especially the transmitting end comprises feedback channel 104, feedback signal processing module 102, optical weight calculating module 103 and transmission power distributing module 105. Feedback channel 104 is used to output information from the receiver concerning characteristics of the current wireless channel; feedback signal processing module 102 is used to receive information from the feedback channel concerning characteristics of the current wireless channel and perform mapping process; optical weight calculating module 103 is used to calculate the transmission power weight values of the two transmitting channels according to information from feedback signal processing module 102 concerning characteristics of the current wireless channels; transmission power distributing module 105 is used to adjust transmission power values of different antennae according to the received transmission power weight values; transmitting antenna array 106 is used to send out the output encoded by space-time encoding module 101 through two independent antennae, according to the current transmission power values.

Figure 3:
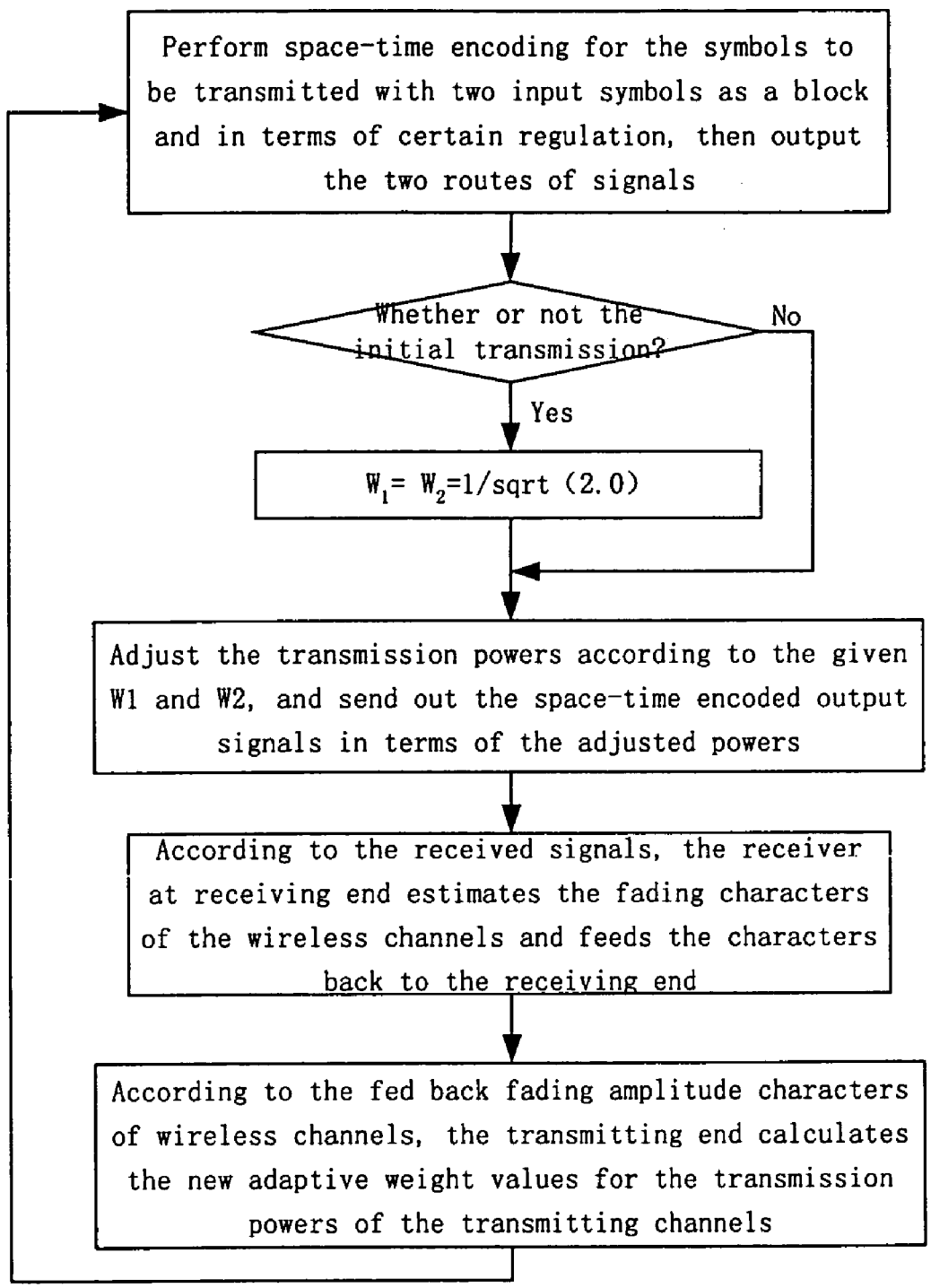
FIG. 3 is the flow chart demonstrating the space-time transmit diversity method in terms of the present invention.

Based on the above system of space-time transmit diversity, the implementing method of the present invention is demonstrated in FIG. 3, at least comprising:

1) The transmitting end performing space-time encoding for the symbols to be transmitted in term of certain regulation, and the input symbols being output in two routes with two symbols $(S_1, S_2)$ as a block: one route staying the same with input block, namely outputting $(S_1, S_2)$, another being the conjugate inverted sequence of input block signal and the first output character being inversed, namely $(-S_2^*, S_1^*)$.

2) Under the precondition of holding the total transmission power invariable, the transmitting end respectively adjusting the current transmission power values of the two antennae according to the current given transmission power weight values in real-time, properly distributing transmission powers of the two transmitting channels.

As to the initial transmission, the initial transmission power weight value of every antenna is set according to equal power principle, namely $w_1=w_2=1/\sqrt{(2.0)}=0.707$.

The adjustment of transmission power is a multiplicative operation in real number in fact, the symbols after multiplicative operation being modulated to analog signal, then being radiated by a radio-wave frequency module. This adjustment of power is often real-timely carried out in the coherent time of wireless channel with the time slot as the unit.

3) After the transmission powers are determined, the transmitting antenna array sending out the space-time encoded output signals through the two independent antennae, according to the current transmission power values.

4) The receiver at the receiving end incorporating the received two routes of signals according to Maximum Likelihood (ML) receiving principle, estimating wireless channel responses respectively and feeding back the responses to the transmitting end, the responses being mapped by the feedback signal processing module and then sent to the optical weight calculating module.

In the existing standard system, because the logical feedback channels are carried by the separately distributed Feedback Information (FBI) bits in the physical channel, a special module is needed at transmitting end to collect and incorporate the separate FBI bits, obtaining a value which can directly represent the ratio of wireless channel fading amplitudes needed for weight value calculation, or encoding the ratio as bit flow to transfer with reference to a certain encoding mode. Therefore, the said mapping process means: obtaining the needed real value through the course of "FBI bits reception"→"FBI bits incorporation"→"FBI decoding", and this value being used as an input parameter for the calculation of transmission power weight values.

5) Then, according to the fading amplitude character information of wireless channels and in term of equation (3), the optical weight calculating module calculating the new adaptive transmission power weight values $w_1$, $w_2$ of the two transmitting channels, and adjusting transmission powers of the two antennae.

$$\begin{cases} w_1 = \dfrac{|h_1|^2}{\sqrt{|h_1|^4 + |h_2|^4}} \\ w_2 = \dfrac{|h_2|^2}{\sqrt{|h_1|^4 + |h_2|^4}} \end{cases} \quad (3)$$

where $h_1$ and $h_2$ being the feedback fading amplitude character information of wireless channels.

Since equation (3) can be simplified in another implementing form, the adaptive weight values can be directly calculated according to the ratio between the fading amplitudes of the current two wireless channels, namely:

$$\begin{cases} w_1 = \dfrac{1}{\sqrt{1 + (|h_2|/|h_1|)^4}} = \dfrac{1}{\sqrt{1 + R^4}} \\ w_2 = \dfrac{1}{\sqrt{1 + (|h_1|/|h_2|)^4}} = \dfrac{1}{\sqrt{1 + (1/R)^4}} \end{cases} \quad (4)$$

where $R \equiv |h_2|/|h_1|$ being the ratio between the fading amplitudes of the two wireless channels.

In practical application, other methods can be adopted when calculating transmission power weight values. However, it's testified by a series of theoretical calculation and abstract tests that equation (3) and equation (4) are the optimum. The optimum is externalized in two aspects: one is the performance gain obtained in the equations, reaching 1.55 dB comparing with the equal-weight manner in the prior art; another is the convenience for implementation, because generally as to other unequal-weight manners both amplitude information and phase information of the two wireless channel responses need being fed back, while as to the present scheme only the amplitude ratio information of the two wireless channel responses, in this way requirement for feedback channel capacity is greatly decreased, and the reliability of feedback information is greatly improved in condition of settled feedback channel capacity.

Figure 4:
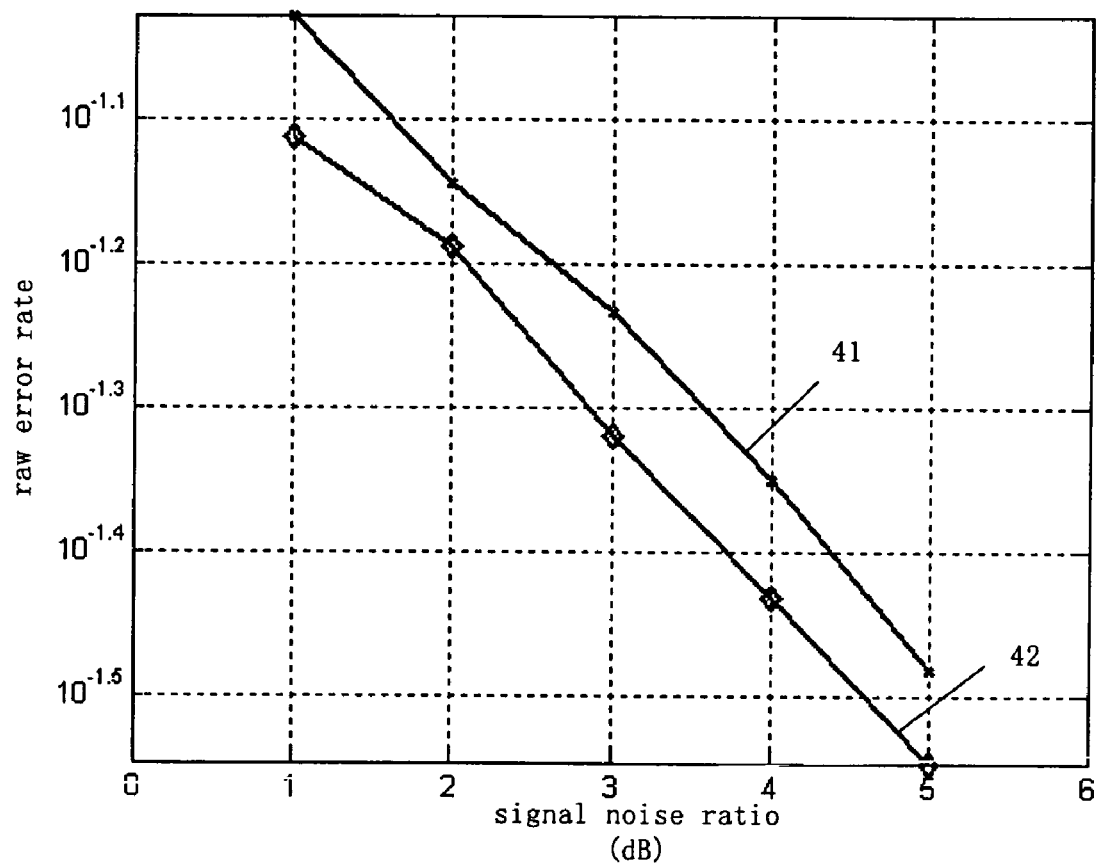
FIG. 4 is the sketch demonstrating the performance contrast between space-time transmit diversity in terms of the present invention and the prior art.

FIG. 4 is the sketch demonstrating the performance contrast between space-time transmit diversity in terms of the present invention and the prior space-time transmit diversity. Therein, the abscissa indicates the dB value of signal noise ratio (Eb/No), and the ordinate indicates raw error rate, curve 41 is the performance curve of the prior STTD, curve 42 is the performance curve of the STTD after adaptive weighting adjustment of transmission power is added in terms of the present invention. It can be seen that when error rate is the same, the signal noise ratio after adding adaptive weighting adjustment of transmission powers is lower than that of the prior STTD, in another way, in condition of equal error rates, lower transmission power is required in terms of the present invention; from another point of view, when the signal noise ratios of the two curves are the same, the error rate after adding adaptive weighting adjustment of transmission powers is apparently lower than that of the prior technology. Obviously, the performance of transmitting diversity in term of the present invention is improved.

The above description is just a better embodiment of the present invention, not necessarily confining the protection range of this invention.

The invention claimed is:

1. A method of adaptive weighting space-time transmit diversity, comprising:
   a. at a transmitting end of a base station, according to a certain regulation, space-time encoding symbols to be transmitted, every two input of which are made as a block, and then outputting two routes of signals;
   b. real-timely adjusting current transmission powers of two transmitting antennas respectively according to currently prescribed transmission power weight values, under the precondition of keeping the gross transmission power of two transmitting antennas invariable;
   c. after the transmission powers are determined, transmitting the space-time encoded output signals at the two independent antennas by a transmitting antenna array in terms of the current transmission powers;
   d. at a receiving end, estimating fading characters of two wireless channels by a receiver according to the present received signals,
   encoding fading amplitude characters of two wireless channels which are real numbers, and then feeding back to the transmitting end;
   e. at the transmitting end, receiving and obtaining the fading amplitude character information of two wireless channels through a feedback channel, calculating new adaptive transmission power weight values which are real numbers in the two transmitting channels, and adjusting the transmission powers according to the weight values;
   wherein calculating the new adaptive transmission power weight values $w_1$ and $w_2$ based on a equation that is:

$$\begin{cases} w_1 = \dfrac{|h_1|^2}{\sqrt{|h_1|^4 + |h_2|^4}} \\ w_2 = \dfrac{|h_2|^2}{\sqrt{|h_1|^4 + |h_2|^4}} \end{cases}$$

where $h_1$ and $h_2$ are the feedback fading amplitude character information of wireless channels.

2. The method according to claim 1, further comprising: for the initial transmission, at the transmitting end setting the said transmission power weight value of the two antennas as 1/sqrt (2.0) in terms of equal transmission power principle.

3. The method according to claim 1, wherein step a further comprises: setting one route of the two signals to be the same as the input block, and another to be the conjugate inverted sequence of the input block, and the first output symbol being inversed.

4. The method according to claim 1, wherein step b further comprises: at the transmitting end, real-timely adjusting the transmission power in the coherent time of wireless channel, with a time slot as a unit.

5. The method according to claim 1, wherein step e of at the transmitting end receiving the fading amplitude character information of wireless channels, further comprises:
   e1. collecting distributed separately Feedback Information (FBI) bits by a feedback signal processing module;
   e2. incorporating the collected FBI bits by the feedback signal processing module;
   e3. decoding the incorporated FBI by the feedback signal processing module, obtaining the values representing the fading amplitude characters of wireless channels, and then inputting to an optimal weight calculating module.

6. The method according to claim 1, before calculating the new adaptive transmission power weight values, further comprising: setting Feedback Information (FBI) field of uplink transmission as the feedback channel, and sending the estimated fading amplitude character information of the two wireless channels to the transmitting end.

7. A method of adaptive weighting space-time transmit diversity, comprising:
   a. at a transmitting end of a base station, according to a certain regulation, space-time encoding symbols to be transmitted, every two input of which are made as a block, and then outputting two routes of signals;
   b. real-timely adjusting current transmission powers of two transmitting antennas respectively according to currently prescribed transmission power weight values, under the precondition of keeping the gross transmission power of two transmitting antennas invariable;
   c. after the transmission powers are determined, transmitting the space-time encoded output signals at the two independent antennas by a transmitting antenna array in terms of the current transmission powers;
   d. at a receiving end, estimating fading characters of two wireless channels by a receiver according to the present received signals,
   encoding fading amplitude characters of two wireless channels which are real numbers, and then feeding back to the transmitting end;
   e. at the transmitting end, receiving and obtaining the fading amplitude character information of two wireless channels through a feedback channel, calculating new adaptive transmission power weight values which are real numbers in the two transmitting channels, and adjusting the transmission powers according to the weight values,
   wherein calculating the new adaptive transmission power weight values $w_1$ and $w_2$ based on a equation that is:

$$\begin{cases} w_1 = \dfrac{1}{\sqrt{1 + (|h_2|/|h_1|)^4}} = \dfrac{1}{\sqrt{1 + R^4}} \\ w_2 = \dfrac{1}{\sqrt{1 + (|h_1|/|h_2|)^4}} = \dfrac{1}{\sqrt{1 + (1/R)^4}} \end{cases}$$

where $R \equiv |h_2|/|h_1|$ is the ratio between the fading amplitudes of the two wireless channels.

8. The method according to claim 7, further comprising: for the initial transmission, at the transmitting end setting the said transmission power weight value of the two antennas as 1/sqrt (2.0) in terms of equal transmission power principle.

9. The method according to claim 7, wherein step a further comprises: setting one route of the two signals to be the same as the input block, and another to be the conjugate inverted sequence of the input block, and the first output symbol being inversed.

10. The method according to claim 7, wherein step b further comprises: at the transmitting end, real-timely adjusting the transmission power in the coherent time of wireless channel, with a time slot as a unit.

11. The method according to claim 7, wherein step e of at the transmitting end receiving the fading amplitude character information of wireless channels, further comprises:
   e1. collecting distributed separately Feedback Information (FBI) bits by a feedback signal processing module;
   e2. incorporating the collected FBI bits by the feedback signal processing module;

e3. decoding the incorporated FBI by the feedback signal processing module, obtaining the values representing the fading amplitude characters of wireless channels, and then inputting to an optimal weight calculating module.

12. The method according to claim 7, before calculating the new adaptive transmission power weight values, further comprising: setting Feedback Information (FBI) field of uplink transmission as the feedback channel, and sending the estimated fading amplitude character information of the two wireless channels to the transmitting end.

* * * * *